3,395,847
SOLDERING DEVICE
Norman R. Buck, 908 Greenvale,
Northfield, Minn. 55057
Filed June 27, 1966, Ser. No. 560,641
6 Claims. (Cl. 228—53)

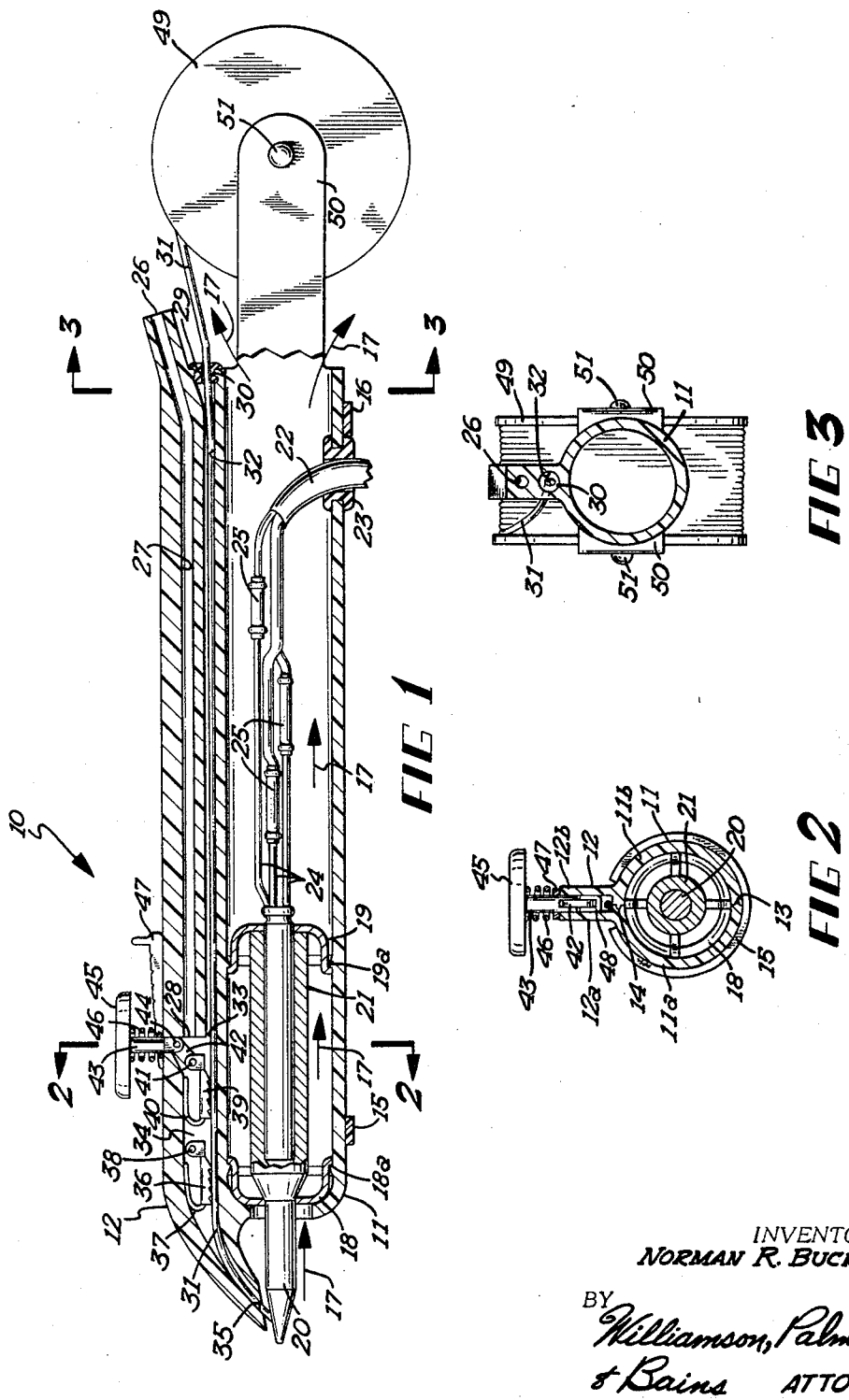

This invention relates to a soldering device and more particularly relates to a soldering iron adapted to supply an inert atmosphere under which the soldering operation may be conducted.

When soldering, it is particularly desirable to have the surfaces to be joined in a very clean condition. Since the joint is made with a molten metallic solder, it is important that an oxide does not form at the point of soldering, decreasing the effectiveness of the soldered joint and the ability to check the joint. To prevent oxide formation, a flux, which is a resin or borax compound is typically included in the core of the solder. When soldering, the solder becomes molten and frees the flux which aids in preventing oxide formation at the joint. The amount of flux necessary to effect a reliable joint decreases, or may be eliminated completely, when the soldering operation is conducted under an atmosphere in which it is impossible for oxides to form. An atmosphere of, for example, nitrogen, argon or carbon dioxide will displace oxygen at the soldering tip and prevent oxide formation. Of course, a flux may also be used to further insure a reliable joint, although the amount of flux necessary is greatly reduced in the inert atmosphere. Although it is difficult and impractical to provide a complete controlled atmosphere when soldering, a limited area of an inert atmosphere would be advantageous. If there is a ready supply of solder, and if the inert gas is properly dispensed with the solder at the point the solder contacts the soldering iron tip, most of the advantages of the inert gas atmosphere are realized.

With these comments in mind it is to the elimination of these and other disadvantages to which the present invention is directed, along with the inclusion therein of other novel and desirable features.

An object of my invention is to provide a new and improved soldering device of simple and inexpensive construction and operation.

Another object of my invention is to provide a novel soldering device which provides an inert gas under which the soldering operation may be conducted thereby aiding in the prevention of formation of oxides on the solder before it flows and increasing the life of the soldering tip.

Still another object of my invention is the provision of an improved novel soldering iron which dispenses solder in predetermined amounts through the inert atmosphere supplied by the soldering iron at the point of soldering allowing the operator to hold the work rather than the solder.

A further object of my invention is the provision of a soldering device which includes a self-cooling heating element and efficient means whereby the soldering tip may be interchanged.

These and other objects and advantages of my invention will more fully appear from the following description made in connection with the accompanying drawings wherein like reference characters refer to the same or similar parts throughout the several views, and in which:

FIG. 1 is a longitudinal sectional view of my soldering device with portions broken away for clarity.

FIG. 2 is a transverse sectional view taken along the line 2—2 of FIG. 1.

FIG. 3 is a transverse sectional view taken along the line 3—3 of FIG. 1.

One form of the present invention is shown in the drawings and is described herein.

Referring to FIG. 1, my soldering device 10 comprises an outer, generally tubular, housing 11 typically constructed of a high-temperature resistant plastic material. A material such as Bakelite may also be used. An elongate conduit 12 is affixed to housing 11 along a longitudinal surface thereof. Main conduit 12 and tubular housing 11 are typically formed in halves with a conventional snap or squeeze lock along inner longitudinal edges. Referring to FIG. 2, the tubular housing is indicated at 11 with the upper main conduit indicated at 12. One portion of the main conduit, which consists of the upper half of the main conduit indicated at 12a, is integral with one portion of the lower tubular housing, indicated at 11a. Similarly, a portion 12b of the upper main conduit is integral with a portion 11b of the lower, tubular housing. Portions 11a and 12a snap or squeeze together with portions 11b and 12b along the upper and lower locking lines indicated at 13 and 14 respectively, to form the tubular housing 11 and the upper main conduit 12. The joints 13 and 14 are of conventional construction and depend upon the resilience of the plastic flexing under pressure to "squeeze" into a mating receiving slot.

Referring back to FIG. 1, tubular housing 11 is reinforced in the locked position by retaining rings 15 and 16 disposed at each end of the tubular housing. It should be noted that elongate housing 11 allows air to pass therethrough in the direction indicated by the several arrows each of which is indicated by numeral 17. A forward spider 18 and a rear spider 19 retain tip 20 within housing 11 which is notched at 18a and 19a respectively to receive the spiders. The spiders are constructed of spring steel and snap in place in housing 11. Spiders 18 and 19 have openings therein to allow passage of air longitudinally through the tubular housing and around tip 20. The heating coil for tip 20 is indicated at 21 and is a standard, commercially available heating element designed to supply heat energy to tip 20. The electrical wiring is generally indicated at 22 passing from housing 11 through grommet 23 to a suitable power source. Conduit 22 passes through housing 11 downwardly and away from the operator's grip area on the soldering iron. The electrical conduit consists of three wires, one of which is a ground. The three wires are indicated at 24 and each includes readily detachable connectors 25. Connectors 25 are commercially available units and allow quick and efficient interchangeability of the combination tip and tip heating unit to provide varying sized tips for the operator.

The main conduit 12 comprises an inert gas port 26 adapted to receive gas under which the soldering operation may be conducted. The gas is typically supplied from a cylinder through a supplementary hose connecting the soldering iron with the cylinder. The gas may then flow through an upper gas conduit 27 to the outlet port 28. Solder is received at inlet 29 through grommet 30 which is retained in main conduit 12 in a conventional manner. Solder is indicated at 31 and is shown advanced through solder conduit 32. Solder conduit 32 terminates at opening 33 disposing the solder within a mixing chamber 34. Gas outlet port 28 and solder outlet 33 communicate with mixing chamber 34 surrounding the solder 31 with gas. Solder is directed by directional or control nozzle 35 into proper position contacting tip 20. Simultaneously, the inert gas flowing through conduit 27 into mixing chamber 34 is directed through the control nozzle 35 into position surrounding and covering tip 20 during the soldering operation. Further, gas is dispensed through the same nozzle as is the solder insuring the proper enveloping of the molten solder at the tip with the inert gas.

As shown in FIG. 1, chamber 34 has a forward spring loaded dog 36 retained therein. The dog has teeth adapted to engage solder 31 and is spring loaded maintaining contact with solder 31 by spring 37 which bears against one wall of chamber 34 thereby forcing the solder 31 against the opposite wall of chamber 34. The dog 36 is pinned within chamber 34 by a pin 38 and is maintained in this position by pin 38. A rear dog 39, similar to dog 36, has teeth engaging solder 31, and is spring loaded with spring 40 bearing against one wall of chamber 34 forcing the solder 31 against an opposing wall of chamber 34. Dog 39 is pivotally connected at pivot point 41 to arm 42 which, in turn, is connected to plunger shaft 43 at pivot point 44. Plunger shaft 43 is actuated by push button 45 which is spring loaded by spring 46. Depression of button 45 forces the shaft 43 downwardly thereby actuating linkage arm 42 to move dog 39 forwardly toward dog 36. Since dog 39 engages solder 31, the solder is moved forwardly, projecting outwardly from control nozzle 35 onto the tip in predetermined amounts. As the button 45 is released, the spring 46 returns shaft 43 to its normal position, returning dog 39 for a subsequent movement. The solder is not returned rearwardly by the rearward motion of dog 39 in that dog 36 engages the solder and maintains it in position since dog 39 is pinned in place.

Referring to FIG. 2, it may be seen that shaft 43 has an upright slot therein adapted to receive solder dispensing guide 47 therein. The solder dispensing guide 47 is seated in a holder 48 which in turn is clamped within housing 12. Referring now to FIG. 1, the solder guide 47 is shown in position. Guide 47 allows plunger 45 to be depressed a great distance thereby feeding a large amount of solder. As solder guide 47 is moved to forward settings, button 45 is allowed to be depressed a shorter distance, thereby dispensing or feeding less solder at the tip. The operator may set solder guide 47 as desired.

The solder is fed from spool 49 which is mounted on a pair of spool retaining elements or arms 50 which extend from housing 11. The spool is rotatably attached at pivot points 51 in any suitable manner.

Referring to FIG. 3, spool 49 is shown with solder 31 thereon which solder is shown as dispensed through conduit 32. Arm 50 extend from housing 11 to receive spool 49 with solder 31 wound thereon. Spool 49 is mounted to arms 50 by suitable pivot means 51.

In operation, the operator first connects a suitable inert gas to port 26 through a flexible connecting cable. Next, a spool of solder 49 is mounted on arms 50 and rotatably mounted thereto by pivots 51. The solder 31 is threaded through conduit 32 and into the mixing chamber 34. In this chamber, the inert gas and the solder contact each other and flow through the opening 35 in the nozzle into contact with tip 20. The inert gas surrounds tip 20 at the point of soldering and over the point of soldering, thereby providing a continuous inert atmosphere under which the soldering may be conducted. The operator dispenses solder by pushing button 45 to actuate the dog 39 which moves a predetermined amount of solder forwardly into engagement with tip 20. A dog 36 prevents the solder from "backing up" into the chamber 34 during the return movement of advancing dog 39. The solder guide may be set in position under push button 45 to determine the amount of solder which is advanced each time the button is actuated.

As the operator solders he grips the tubular portion 11, which is approximately three-quarter inches in diameter. The upper conduit for the inert gas and the solder is very small, approximately a quarter inch by one-half inch rectangular cross section, and does not interfere with the grip and manipulation of the soldering device. As the tip 20 is heated by heating element 21, air flows through tubular housing 11 and around the heating element 21 to maintain a cool soldering device, allowing the operator to firmly grip the soldering device at all times. When the operator wishes to change tips, this may be easily done by removing forward spider 18 and rear spider 19 from the tubular housing and breaking the quick connectors 25 to completely release the soldering tip and heating element. A new element and tip may then be reinserted, spiders 18 and 19 return to position, and a new connection made by connectors 25.

From the foregoing it will be seen that I have provided a new and novel soldering iron which is not only simple and inexpensive, both in construction and operation, but is of such a size that it is easily manipulated for close and detailed soldering.

The soldering device of my invention provides an inert gas atmosphere under which the soldering operation is conducted, to provide not only a better joint, but a joint which is more easily inspected in that it is not covered with an oxide. Since the inert gas surrounds the solder at the time the solder becomes molten, oxide is prevented from forming on the solder before it flows. My soldering device provides a mixing chamber which allows the solder and inert gas to be dispensed at the tip of the soldering iron simultaneously, thereby insuring adequate and properly positioned inert gas at the precise point of soldering. Since the solder may be dispensed in predetermined amounts as required, the operator need only grip the soldering device and the item being soldered. He need not prop or otherwise secure the workpiece on which the soldering is being conducted. This feature greatly enhances the maneuverability of my soldering iron.

Since soldering is conducted under an inert gas, the tip life is greatly prolonged. Further, as the industry switches from copper circuits to aluminum circuits, the soldering joint becomes more important since aluminum soldering is more difficult and requires a more controlled atmosphere. It should also be noted that all of the features of my soldering device may be combined into a pistol-grip soldering device by simply attaching a grip portion to the tubular portion of my soldering device.

It will, of course, be understood that various changes may be made in the form, details, arrangement and proportions of the various parts without departing from the scope of my invention.

What is claimed is:

1. A soldering device adapted to solder under an inert atmosphere, said soldering device comprising
   a generally tubular housing,
   a soldering tip detachably mounted in said housing, said soldering tip having means heating said soldering tip operably connected thereto, the heating means adapted to be connected to a suitable power source,
   a main conduit member affixed to said tubular housing, said main conduit member having an inert gas-conducting conduit, a solder wire-conducting conduit and a mixing chamber adapted to receive and communicate with the gas-conducting conduit and the solder wire-conducting conduit whereby the solder wire in the mixing chamber is surrounded by inert gas, and
   nozzle means communicating with the mixing chamber of said main conduit member, said nozzle means adapted to direct solder wire and inert gas onto said soldering tip thereby providing an atmosphere of inert gas surrounding the precise point of the soldering operation.

2. The soldering device of claim 1 wherein said generally tubular housing includes an opening forwardly of said soldering tip and an opening rearwardly of said soldering tip whereby air may pass through said housing and around said soldering tip and heating means whereby heat output from the heating means for said soldering tip may be carried off through said housing by the flow of air through the forward and rearward openings in said tubular housing.

3. The soldering device of claim 1 including means adapted to dispense solder wire in predetermined amounts through said nozzle means whereby the predetermined amount of solder wire is directed onto said soldering tip.

4. The soldering device of claim 3 wherein said means dispensing solder wire includes a manually operated push button affixed to said main conduit member and first dog means operably connected thereto, the dog means adapted to engage solder wire in the mixing chamber, advancing the solder wire in response to actuation of said push button, and second dog means disposed forwardly of said first dog means, said second dog means disposed in the mixing chamber and adapted to engage solder wire and maintain solder wire in position as advanced by said first dog means as said first dog means is retracted to solder wire advancing position.

5. The soldering device of claim 1 wherein said soldering tip and heating means are adapted to be connected to a suitable power source by detachable electrically conductive couplings and including detachable spider means affixed to said soldering tip and heating means and detachably mounted in said generally tubular housing whereby said soldering tip is positioned to receive solder wire from said nozzle means.

6. The soldering device of claim 1 including spool retaining elements affixed to said generally tubular housing rearwardly of said soldering tip, said spool retaining elements adapted to receive a spool of solder wire for rotatable movement thereon, positioning said solder wire whereby the solder wire may be received by the solder wire-conducting conduit in said main conduit member.

References Cited

UNITED STATES PATENTS 2,843,073   7/1958   Voss _____ 228—53

RICHARD H. EANES, JR., *Primary Examiner.*